(12) United States Patent
Voisine (10) Patent No.: US 9,157,480 B2
(45) Date of Patent: Oct. 13, 2015

(54) TWO STAGE SEAL FOR A BEARING ASSEMBLY

(71) Applicant: ROLLER BEARING COMPANY OF AMERICA, INC., Oxford, CT (US)

(72) Inventor: James Voisine, Burlington, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/099,121

(22) Filed: Dec. 6, 2013

(65) Prior Publication Data

US 2014/0093198 A1   Apr. 3, 2014

Related U.S. Application Data

(63) Continuation-in-part of application No. 13/682,886, filed on Nov. 21, 2012, now Pat. No. 8,926,185, which is a continuation-in-part of application No. 12/144,140, filed on Jun. 23, 2008, now abandoned, (Continued)

(51) Int. Cl.
*F16C 33/74* (2006.01)
*F16C 23/04* (2006.01)
*F16C 33/10* (2006.01)

(52) U.S. Cl.
CPC .............. *F16C 33/74* (2013.01); *F16C 23/045* (2013.01); *F16C 33/102* (2013.01); *F16C 33/743* (2013.01); *F16C 2240/42* (2013.01); *F16C 2240/70* (2013.01)

(58) Field of Classification Search
CPC ............. F16C 11/0666; F16C 11/0671; F16C 11/0676; F16C 23/045; F16C 33/74; F16C 2240/42; F16C 2240/70; F16C 33/743

USPC ......... 384/130, 139, 140, 143, 145–148, 203, 384/208; 277/353, 500, 551, 584
See application file for complete search history.

(56) References Cited

U.S. PATENT DOCUMENTS

| 2,428,411 A | 10/1947 | Davis |
| 3,848,938 A | 11/1974 | Stella |

(Continued)

FOREIGN PATENT DOCUMENTS

| BE | 514022 A | 5/1954 |
| EP | 1801433 A1 | 6/2007 |

(Continued)

OTHER PUBLICATIONS

International Search Report and Written Opinion from corresponding PCT Application No. PCT/US2013/073579, dated Apr. 17, 2014.

(Continued)

*Primary Examiner* — James Pilkington
(74) *Attorney, Agent, or Firm* — MKG, LLC (57) ABSTRACT

A bearing assembly includes an inner member having an outer engagement surface and an outer race. The outer race has an inner surface defining a first end and a second end and an inner engagement surface therebetween, the inner engagement surface is positioned on the outer engagement surface of the inner member. A first annular groove is formed in the inner surface, proximate one of the first end and the second end. A second annular groove is formed in the inner surface and is positioned axially inward from the first annular groove. An external seal is positioned in first annular groove and slidably engages the inner member. An internal seal is positioned in the second annular groove and slidingly engages the inner member.

20 Claims, 9 Drawing Sheets

Related U.S. Application Data which is a continuation-in-part of application No. 11/880,138, filed on Jul. 19, 2007, now abandoned.

(60) Provisional application No. 60/832,054, filed on Jul. 19, 2006, provisional application No. 61/734,697, filed on Dec. 7, 2012.

(56) References Cited

U.S. PATENT DOCUMENTS

| | | | |
|---|---|---|---|
| 4,055,369 A | | 10/1977 | Lynn |
| 4,080,013 A | | 3/1978 | Koch |
| 4,080,015 A | * | 3/1978 | Greby et al. .................. 384/206 |
| 4,109,976 A | * | 8/1978 | Koch ............................ 384/192 |
| 4,190,302 A | | 2/1980 | Lynn |
| 4,253,711 A | | 3/1981 | Lynn |
| RE31,417 E | | 10/1983 | Huber |
| 4,447,094 A | | 5/1984 | Trudeau |
| 4,718,779 A | * | 1/1988 | Trudeau ........................ 384/206 |
| 4,768,889 A | | 9/1988 | Loser |
| 4,819,854 A | | 4/1989 | Schmehr |
| 4,836,694 A | | 6/1989 | Schmehr |
| 5,288,354 A | | 2/1994 | Harris et al. |
| 5,839,834 A | | 11/1998 | Acampora, Jr. |
| 5,873,658 A | * | 2/1999 | Message et al. .............. 384/448 |
| 6,626,575 B2 | | 9/2003 | Hartl |
| 6,644,883 B2 | | 11/2003 | Davis |
| 8,333,515 B2 | | 12/2012 | Milliken |
| 2002/0025091 A1 | | 2/2002 | Sasaki |
| 2011/0091143 A1 | | 4/2011 | Murphy |
| 2013/0022299 A1 | | 1/2013 | Voisine |

FOREIGN PATENT DOCUMENTS

| | | |
|---|---|---|
| EP | 2505858 A2 | 10/2012 |
| GB | 1360515 A | 7/1974 |
| GB | 2168114 A | 6/1986 |

OTHER PUBLICATIONS

International Preliminary Report on Patentability issued in PCT Application No. PCT/US2013/073579, dated Nov. 7, 2014, pp. 1-7.

* cited by examiner

TWO STAGE SEAL FOR A BEARING ASSEMBLY

CROSS REFERENCE TO RELATED APPLICATIONS

This application is a continuation-in-part application of U.S. Ser. No. 13/682,886, filed Nov. 21, 2012 (now U.S. Pat. No. 8,926,185 issued on Jan. 6, 2015) which is a continuation-in-part application of U.S. Ser. No. 12/144,140, filed Jun. 23, 2008, which is a continuation-in-part of U.S. Ser. No. 11/880,138, filed Jul. 19, 2007, which claims the benefit of U.S. provisional application No. 60/832,054 filed Jul. 19, 2006, which are incorporated herein by reference in their entirety. This application also claims the benefit of U.S. provisional application No. 61/734,697 filed Dec. 7, 2012, which is incorporated herein by reference in its entirety.

TECHNICAL FIELD

The present invention relates generally to seals for bearing assemblies and, in particular, to a two stage seal for spherical plain bearing assemblies to inhibit contamination from entering the bearing raceways. More particularly, the present invention is directed to a spherical plain bearing assembly having a sealing arrangement that incorporates two different types of seals; an internal scraper seal and a flexible external seal.

BACKGROUND

Spherical plain bearing assemblies typically comprise a ball positioned for rotational movement in an outer race. The ball defines an outer surface, and the outer race defines an inner surface contoured to receive and retain the ball therein such that the outer surface of the ball is in sliding engagement with the inner surface of the outer race. Contamination of the sliding engagement surfaces, namely, the outer surface of the ball and the inner surface of the outer race, is one of the leading causes of bearing damage. Typically, the spherical plain bearing assembly includes a single sealing arrangement on opposing sides thereof, wherein a seal is provided in a single groove for retaining lubrication between the sliding engagement surfaces and for inhibiting the ingress of dirt, water, particulate matter, and other contaminants to the sliding engagement surfaces.

For example, a single spread lock type seal is positioned in each single groove positioned on opposing sides of a spherical bearing, as described in U.S. Pat. No. 6,626,575, the subject matter of which is incorporated herein by reference. Typically, a single groove on each of opposing sides of the spherical bearing was employed to minimize the axial dimensions of the bearing while maximizing the load bearing capability of and sliding engagement between, the outer surface of the ball and the inner surface of the outer race. Thus, use of more than one groove or seal per bearing side was not considered.

SUMMARY

In one aspect, the present invention resides in a bearing assembly (e.g., a spherical plain bearing assembly) that includes an inner member (e.g., a ball) having an outer engagement surface. The bearing assembly also includes an outer race having an inner surface defining a first end and a second end. The inner surface is positioned on the outer engagement surface of the inner member. A first annular groove is formed in the inner surface, proximate one of the first end and the second end. A second annular groove is formed in the inner surface and is positioned axially inward from the first annular groove. An external seal is positioned in first annular groove and slidably engages the inner member. An internal seal is positioned in the second annular groove and slidingly engages the inner member.

In another aspect, the present invention resides in a sealing arrangement for a bearing assembly (e.g., a spherical plain bearing assembly) having an inner member (e.g., a ball) with an outer engagement surface, an outer race having an inner surface. The inner surface is slidably and rotatably engaged with the outer engagement surface. The sealing arrangement includes an external seal positioned in a first annular groove defined in the inner surface and slidably engaging the inner member. The sealing arrangement also includes an internal seal positioned in a second annular groove defined in the inner surface and slidably engaging the inner member.

In another aspect, the present invention resides in a method of sealing a spherical plain bearing assembly comprising the steps of providing a spherical plain bearing having an outer race and an inner member (e.g., a ball) disposed in the outer race. The inner member and the outer race are rotatable relative to each other. The outer race has an inner surface that has a first annular groove formed therein proximate to each of two opposing ends of the outer race. The inner surface has a second annular groove positioned axially inward from each of the respective first annular grooves. The method includes providing an internal seal and positioning the internal seal in one or more of the second annular grooves. The method also includes providing an external seal and positioning the external seal in one or more of the first annular grooves.

DETAILED DESCRIPTION

Figure 1:
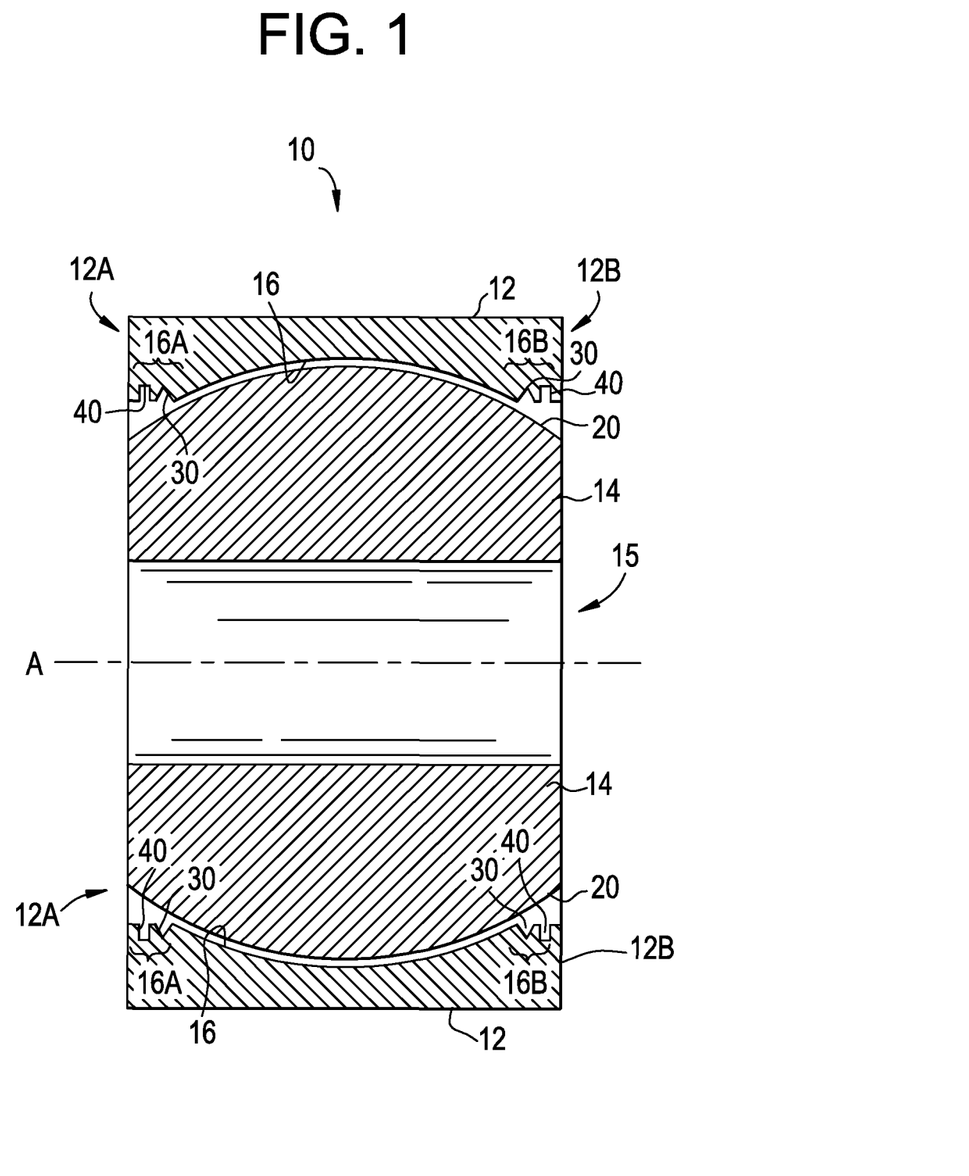
FIG. 1 is a cross sectional view of a bearing assembly having a sealing arrangement that accommodates two different types of seals in accordance with one embodiment of the present invention.

As shown in FIG. 1, a bearing assembly 10 comprising a spherical plain bearing designated generally by the reference number 10 and is hereinafter referred to as "bearing assembly 10." The bearing assembly 10 includes an outer ring or outer race 12 and an inner member or ball 14 disposed therein. The outer race 12 defines a first end 12A and a second end 12B. As described further herein, the bearing assembly 10 includes a two stage seal proximate each of the first end 12A and the second end 12B. The ball 14 defines a bore 15 extending therethrough, the bore being located substantially concentrically about an axis "A" extending through the bearing assembly 10. The bore 15 is adapted to receive a portion of a shaft or other component therein (not shown). The present invention is not so limited, as the ball 14 may be integral with or be formed as part of a shaft or other component. Moreover, while the bore 15 is shown and described as extending completely through the ball 14, the present invention is not limited in this regard as the bore may extend only part-way through the ball. Although a spherical plain bearing is shown and described, the present invention is not limited in this regard as other types of bearings may be employed, including but not limited to journal bearings and roller bearings.

In the illustrated embodiment, the outer race 12 is a ring that defines an inner surface 16 having a spherically concave contour. The inner surface 16 is contoured to receive a spherically convex contoured surface 20 of the ball 14. The inner surface 16 of the outer race 12 is in sliding disposition to the spherically convex contoured surface 20 of the ball 14. The ball 14 and the outer race 12 are rotatable relative to each other. Rotation of the ball 14 in the outer race 12 may also allow a shaft coupled to or extending through the ball to be misaligned relative to the axis A. While the outer race 12 has been shown and described as being a ring, the present invention is not limited in this regard as the outer race can assume any practical shape or be part of another component, such as, for example a housing, without departing from the broader aspects of the invention.

In one embodiment as shown in FIG. 1, the inner surface 16 of the outer race 12 terminates proximate to the first and second ends 12A and 12B of the outer race 12. The outer race 12 further defines a first inner surface end 16A proximate to the first end 12A of the outer race 12, and a second inner surface end 16B proximate to the second end 12B of the outer race 12. Each of the first inner surface end 16A and the second inner surface end 16B define a first annular groove 40 and a second annular groove 30. In one embodiment, the first annular groove 40 is substantially concentric with the second annular groove 30. One of the first annular grooves 40 is formed in the first inner surface 16A, proximate the first end 12A; and another of the first annular grooves 40 is formed in the second inner surface 16B, proximate the second end 12B. One of the second annular grooves 30 is formed in the first inner surface 16A, axially inward of the first annular groove 40; and another of the second annular grooves 30 is formed in the second inner surface 16B, axially inward of the first annular groove 40. The two stage seal includes the first annular groove 40 and the second annular groove 30, as well as the seals disposed therein as described further herein. In one embodiment, the first annular groove 40 defines a cross section having a substantially V-shaped geometry and the second annular groove 30 defines a cross section having substantially U-shaped geometry.

As a result of testing and experimentation, the inventor has found that using two separate annular grooves 30 and 40 proximate each of the two ends 12A and 12B of the outer race 12 allows the use of two different seal types (e.g., an internal stiff scraper seal 32 and an external flexible seal 42 for improved conformance to the ball 14). The inventor has also discovered that use of two grooves 30 and 40 creates an additional void volume between the two grooves which can be filled with a lubricant for an additional sealing barrier. Test results demonstrated that the additional sealing barrier extended seal life. Prior to the present invention, those skilled in the relevant art were discouraged from use more than one groove because the second seal groove would require either a wider outer ring or loss of contact area in the bearing. The inventor was able to overcome this disadvantage, by employing an inner groove that accepts a seal having a small cross section, as described further herein.

While the outer race 12 has been shown and described as defining a first annular groove 40 and a second annular groove 30, the present invention is not limited in this regard as the outer race can define less (e.g., one) or more (e.g., three or more) than a first annular groove 40 and a second annular groove 30 without departing from the broader aspects of the invention. While the first annular groove 40 has been shown and described as defining a cross section having a substantially V-shaped geometry and the second annular groove 30 has been shown and described as defining a cross section having a substantially U-shaped geometry, the present invention is not limited in this regard as the first annular groove 40 and the second annular groove 30 can define respective annular grooves having a variety of geometric configurations, and in particular any geometric configuration corresponding to an annular seal or ring configuration, without departing from the broader aspects of the invention. In addition, the first annular groove 40 and the second annular groove 30 can define respective annular grooves having the same geometric configuration.

Figure 3:
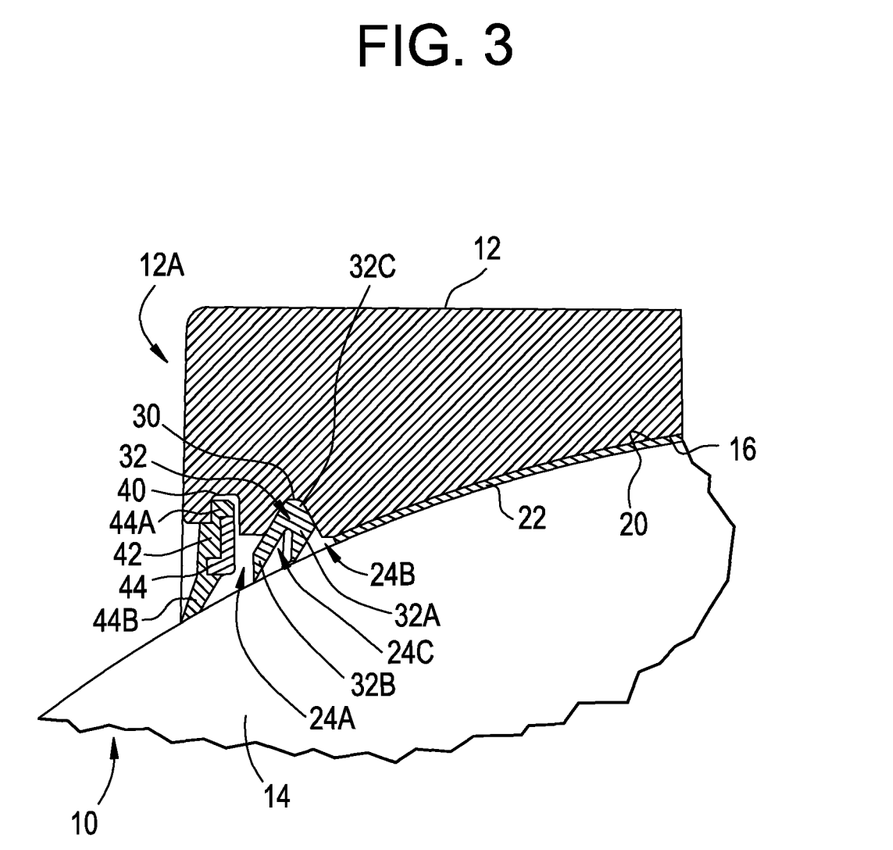
FIG. 3 is a cross sectional view of a portion of the bearing assembly shown in FIG. 1 having an internal seal and an external seal.

As shown in FIG. 3, one stage of the two stage seal of the bearing assembly 10 includes a first flexible external ring or seal 42 positioned in the first annular groove 40 proximate the first end 12A of the outer race 12. The first external seal 42 slidably engages the ball 14 and extends across the interface of the outer race 12 and the ball 14. A second flexible external seal 42 (not shown) is positioned in the first annular groove 40 (not shown in FIG. 3) proximate the second end 12B of the outer race 12. The second external seal 42 slidably engages the ball 14 and extends across the interface of the outer race 12 and the ball 14. The first and second external seals 42 inhibit the ingress of debris and contaminants into the bearing assembly 10.

Referring to FIG. 3, in one embodiment, the flexible external seal 42 includes a metal backing 44. In one embodiment, the flexible external seal 42 defines a first end 44A and a distal or second end 44B. The first end 44A defines a block-shaped cross section corresponding to the substantially U-shaped cross section geometry defined by the first annular groove 40, and the second end 44B slidingly engages the ball 14. The flexible external seal 42 conforms to the outer contour of the spherical ball 14 thereby creating a primary seal that is further enhanced by the internal seal 32. In addition, the sealing arrangement of the present invention provides for retaining lubrication between the sliding engagement surfaces of the outer race 12 and the ball 14. In one embodiment the first and second flexible external seals 42 are manufactured from synthetic rubber, soft plastic, felt, PTFE, or the like. In one embodiment, the flexible external seal 42 comprises a single lip, metal-backed elastomeric external seal.

Figure 2:
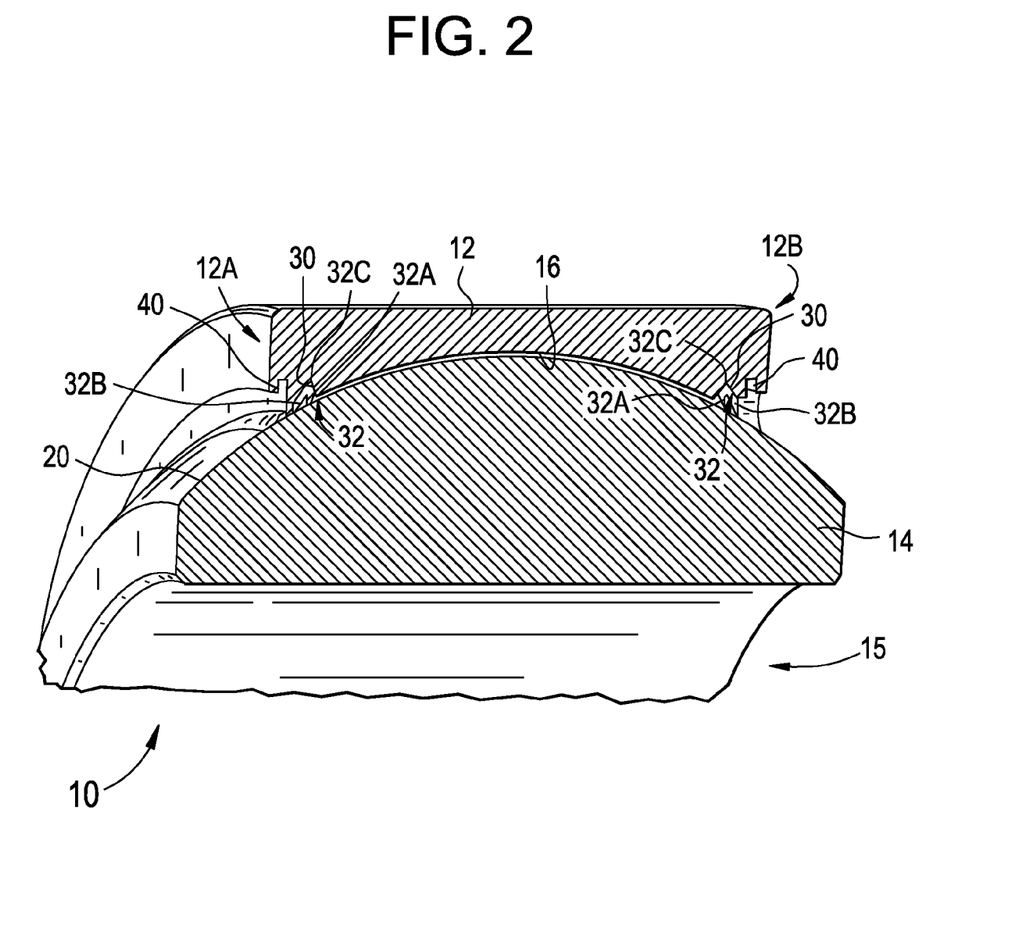
FIG. 2 is a perspective view of a portion of the bearing assembly shown in FIG. 1 having an internal seal.
Figure 5:
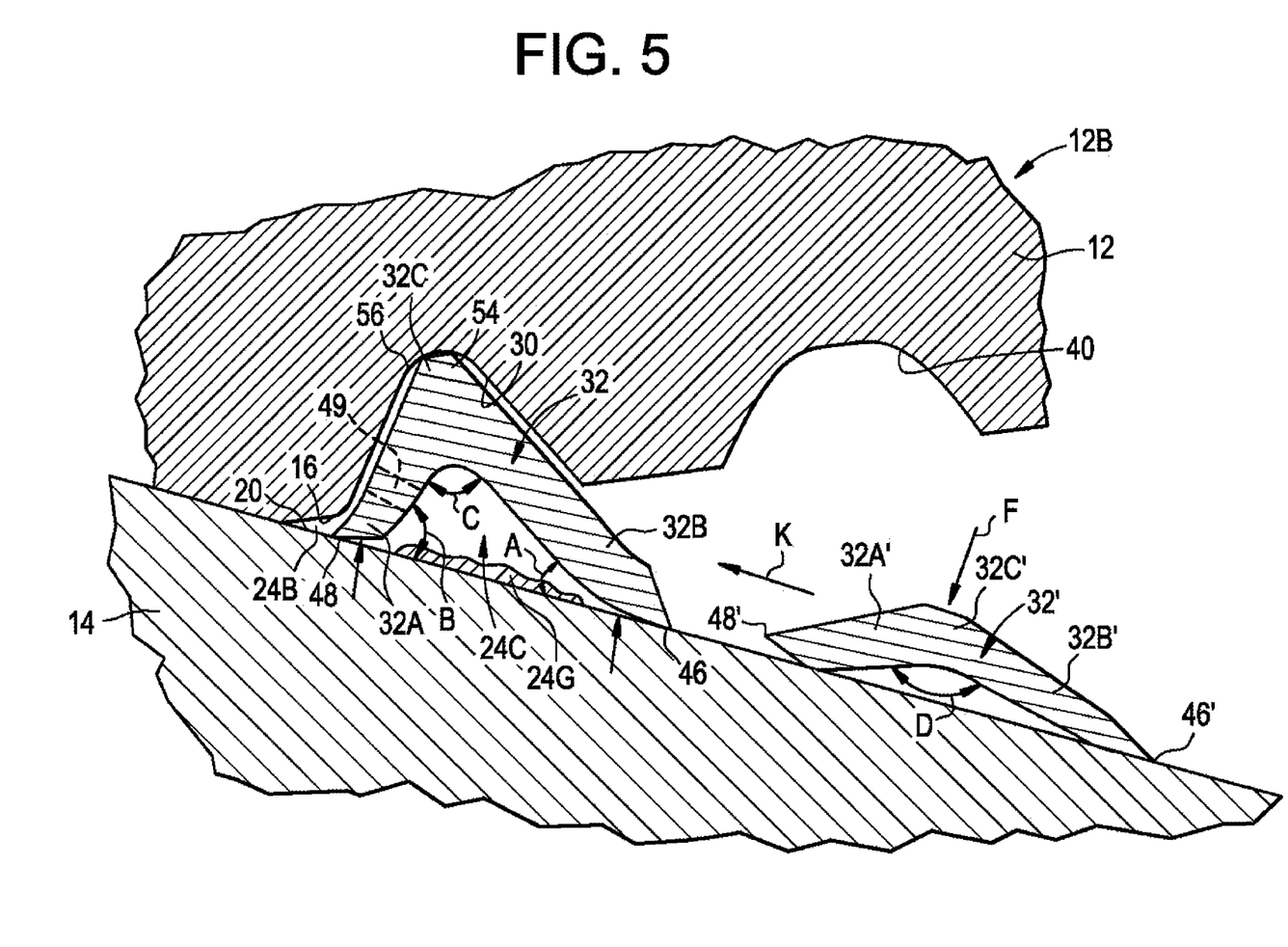
FIG. 5 is a cross sectional view of a portion of the bearing assembly of FIG. 1 illustrating installation of an internal seal.
Figure 6A:
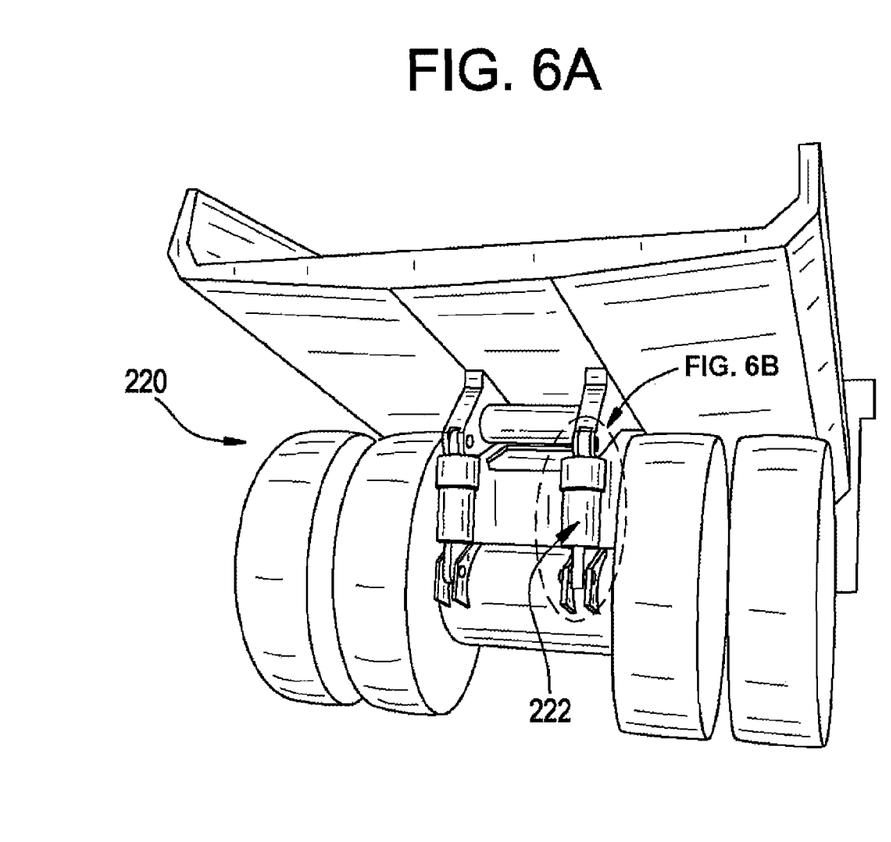
FIG. 6A is a perspective view of a rear portion of a heavy haul truck.
Figure 6B:
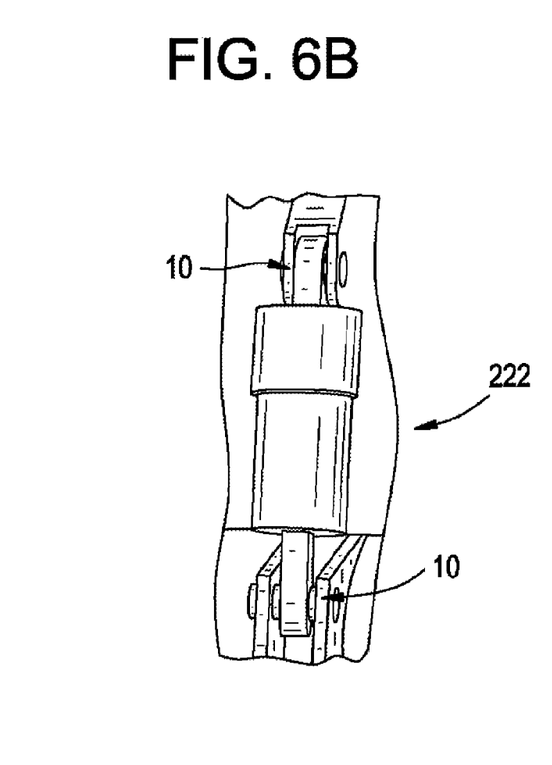
FIG. 6B is an enlarged view of a strut detail 6A of the heavy haul truck of FIG. 6A.
Figure 7:
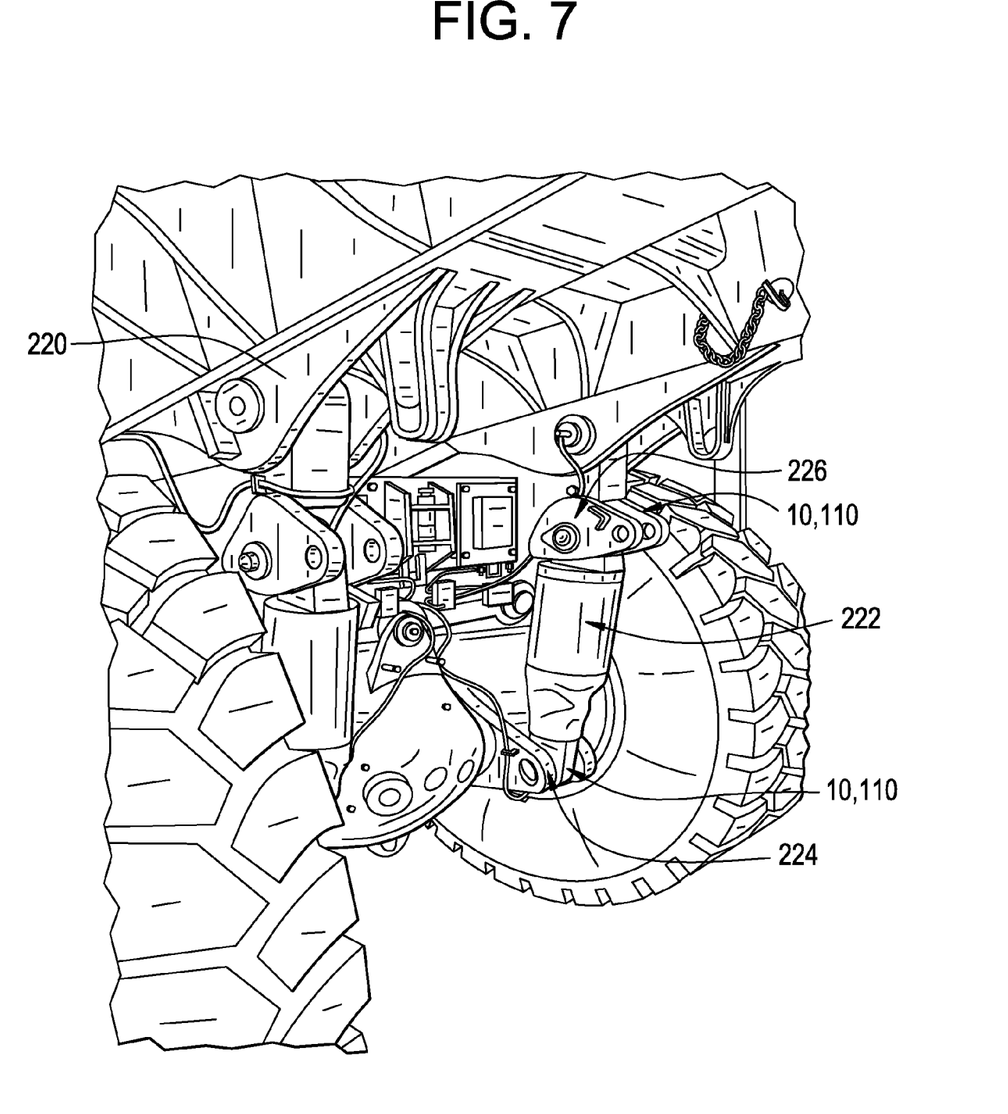
FIG. 7 is perspective view of a rear portion of a heavy haul truck illustrating rear struts.
Figure 8:
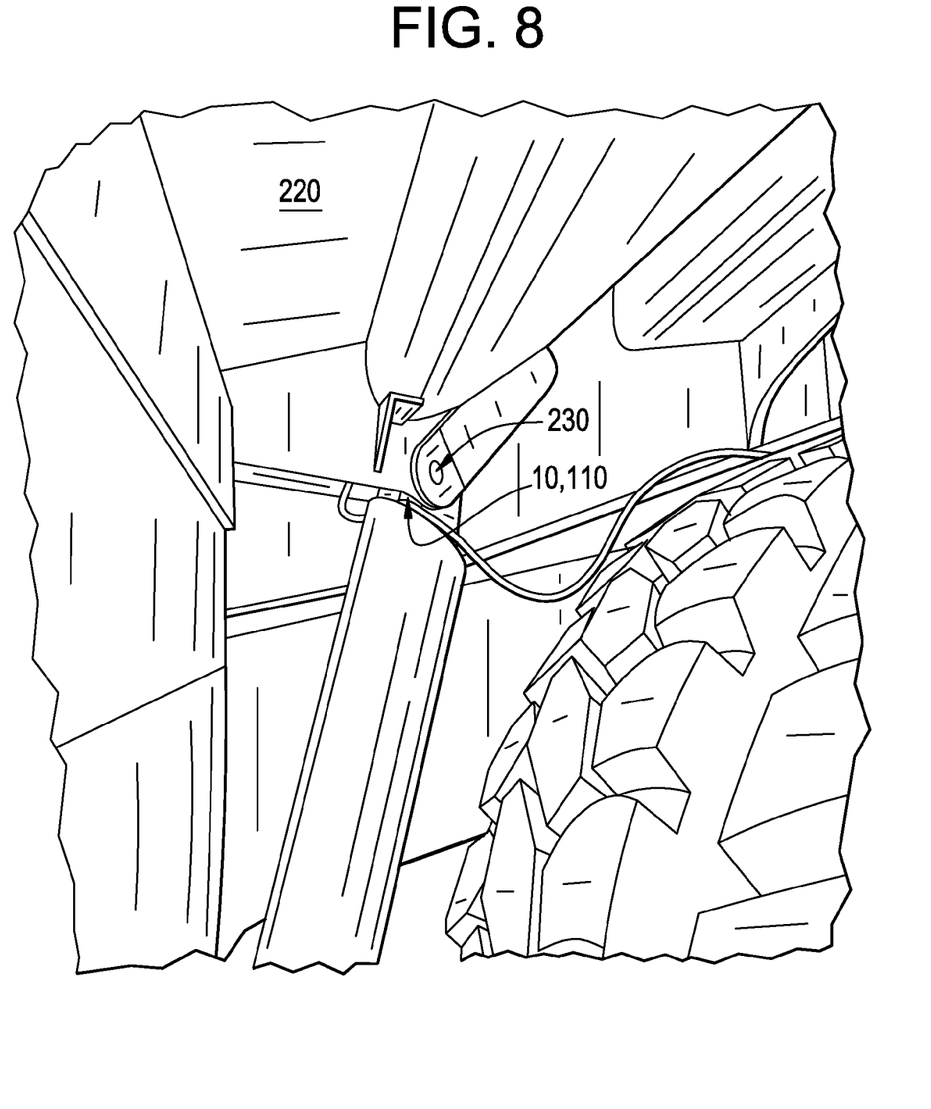
FIG. 8 is perspective view of a hoist cylinder portion of a heavy haul truck illustrating a hoist cylinder a spherical bearing.
Figure 9:
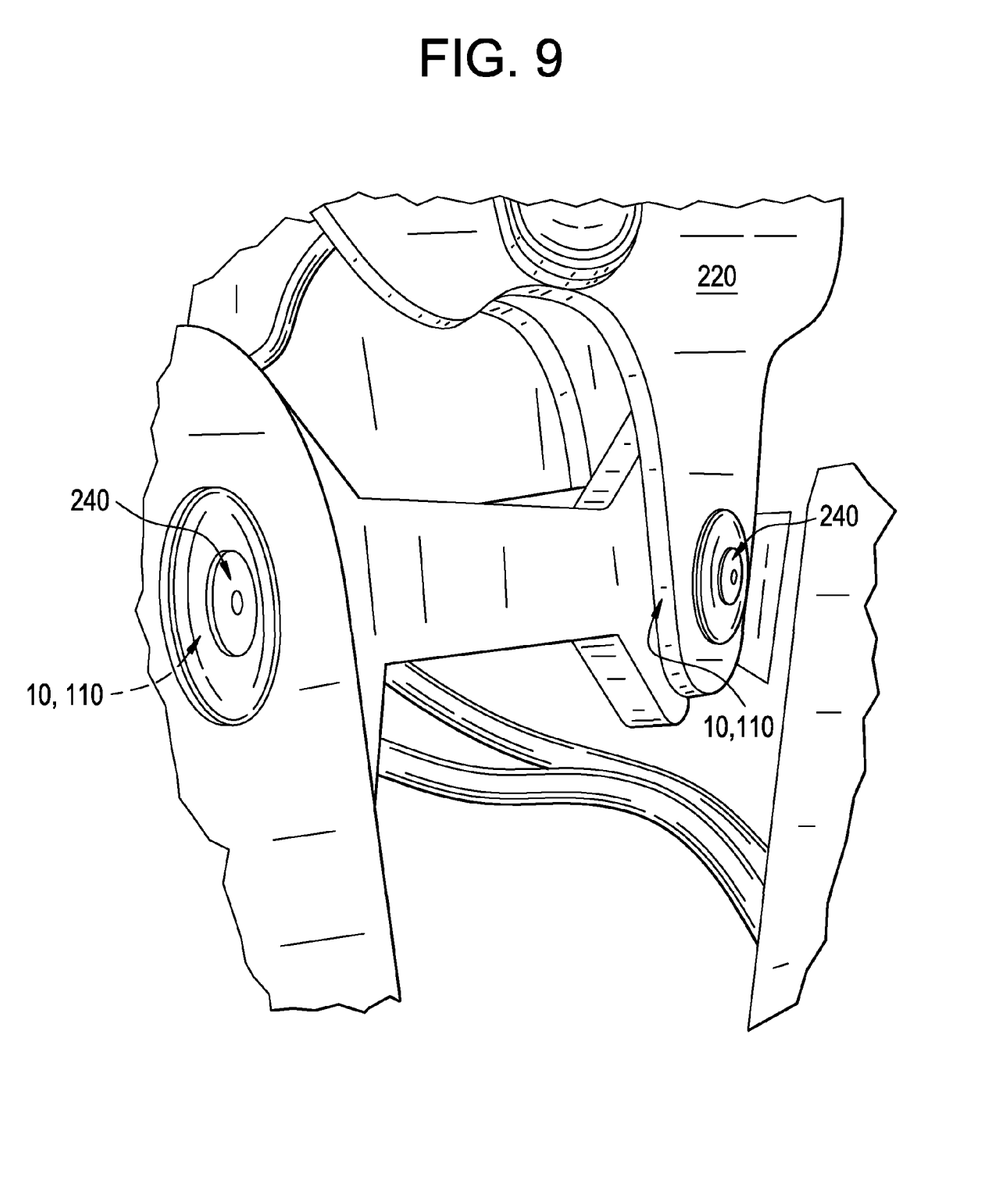
FIG. 9 is perspective view of a panhard link portion of a heavy haul truck illustrating spherical bearings.

As shown in FIGS. 2, 3 and 5 a second stage of the two stage seal of the bearing assembly 10 includes an internal ring or internal seal 32 positioned in each of the second annular grooves 30. The internal seal 32 slidably engages the ball 14 and extends across an interface of the outer race 12 and the ball 14. The internal seal 32 inhibits the ingress of debris and contaminants into the bearing assembly 10, and more specifically to the sliding surfaces defined by the inner surface 16 and the spherically convex contoured surface 20. The internal seal 32 is positioned axially inward of the respective external seal 42, as the inventors have discovered as a result of testing and experimentation that if a flexible seal (e.g., similar to the flexible external seal 42) is used inwardly of an external seal retention was not possible and the inwardly positioned flexible seal would dislodge from the bearing 10 when the outer race 12 moves relative to the ball 14.

In one embodiment, the internal seal 32 defines a cross section having a substantially V-shaped cross section defined by an inner lip 32A, an outer lip 32B and a base 32C therebetween. The V-shaped cross section provides a seal that is more axial narrow than the flexible external seal 42 or typical seals. Thus, the V-shaped cross section allows for use of a second stage of the two stage seal, without excessively increasing the axial length of the bearing or excessively reducing the load bearing area of the bearing. Each of the inner lip 32A and outer lip 32B define a respective first end proximate to the apex 32C therebetween, and a respective second or distal end that slidingly engages the ball 14.

In one embodiment, the internal seal 32 is manufactured from a material that is stiffer, harder and more rigid than the flexible external seal 42 to provide a stiff or rigid internal scraper to scrape contamination off the ball 14 when the bearing assembly 10 is subjected to a tilt/misalignment movement. In one embodiment the rigid internal seal 32 is manufactured from a material such as metal or plastic. In one embodiment, the internal seal 32 is a double lip internal scraper seal manufactured from a thermoplastic material.

In one embodiment as shown in FIGS. 2, 3 and 5 the sealing arrangement of the bearing assembly 10 is further enhanced by filling a first void volume 24A formed between the rigid internal seal 32 and the flexible external seal 42, a second void volume 24B formed between the rigid internal seal 32 and the engagement surfaces of the outer race and the ball, and a third void volume 24C formed between the inner lip 32A and the outer lip 32B of the rigid internal seal 32, with a lubricant 24G or other sealant material. In one embodiment, the rigid internal seal 32 comprises a thermoplastic double lip internal scraper seal, such as for example, a SpreadLock® Seal which is available from the Roller Bearing Company of America and is described in U.S. Pat. No. 6,626,575 which patent is incorporated herein in its entirety.

As best shown in FIG. 5, the inner lip 32A extends outwardly from the base 32C in a direction oppositely from the direction of extension of the outer lip 32B. This inner lip 32A is at an acute angle B from the convex surface 20. As such, in this particular configuration the outer lip 32B and the inner lip 32A form a downwardly facing V-shape which engages the spherically convex inner race bearing surface 20 for sealing thereof against the movement of lubrication passed either of the lips 32A and 32B and also provides double protection against the flow of contaminants inwardly to the lubricating area. Preferably an acute angle C is defined between the inner lip 32A and the outer lip 32B. In the most particular configuration, angles A, B and C will all be approximately sixty degrees. However, these values can vary as shown and described in U.S. Pat. No. 6,626,575.

Still referring to FIG. 5, to further enhance lubrication, a plurality of lubrication holes 49 (only one hole shown) extend through the inner lip 32A. The lubrication holes 49 are located, for example, at multiple locations about the generally annular internal seal 32. The holes 49 allow lubrication to flow from the area of engagement between the inner race bearing surface 20 and the bearing surface 16 (e.g., the second void volume 24B) to the portion of the outer race bearing surface 20 located between the inner lip 32A and the outer lip 32B (e.g., the third void volume 24C) to facilitate lubrication of the convex contoured surface 20 and the inner surface 16 of the outer race 12. The holes 49 also allow for overflow lubrication during normal maintenance re-lubrication of the bearing.

Securing the internal seal 32 into the second annular groove 30 is enhanced by the resilience of the internal seal 32. The position of insertion and the position after insertion are shown best in FIG. 5, wherein a compressed configuration of the internal seal 32' is illustrated to the right of the installed and expanded seal 32. In the compressed configuration shown in the right of FIG. 5. In the compressed configuration, the angle D between the inner and outer lips 32A and 32B is significantly increased when compressed downwardly by the exertion of force as indicated by the arrow of reference element F. The exertion of a downwardly directed force such as by automated installation means or merely a user's hand or finger will compress the internal seal 32' to the position shown on the right, namely the compressed position. In the compressed configuration, the outer lip 32B' and the inner lip 32A' are compressed to a position almost parallel to the convex contoured surface 20. This allows the insertion personnel to slide the compressed internal seal 32' upwardly until the seal is in position beneath the seal mounting groove 30 whereafter the user can release the force exerted along arrow F to allow the compressed internal seal 32' to snap into place as shown in the left portion of FIG. 5. Insertion of the compressed internal seal 32' occurs along the insertion direction arrow K.

As shown in FIG. 5, engagement between the outer lip 32B and the inner lip 32B relative to the generally spherically convex inner race bearing surface 20 is greatly enhanced by use of pointed ends thereon. In particular, the outer lip 32B defines an outer pointed end 46 at the extreme outwardly most portion thereof which facilitates resilience of the outer lip 32B and wiping of the inner race bearing surface 20 as desired. In a similar manner, the inner lip 32A defines an inner pointed end 48 thereon which facilitates resilience and slight bending or flexing of the inner lip 32A during insertion and after insertion to maintain contact with the bearing surface even after significant wear occurs.

The internal seal 32 is usable with symmetrical sealing mounting grooves such as the V-shaped groove shown in FIG. 5. However, the internal seal 32 of the present invention is also usable with respect to asymmetrical seal mounting grooves as shown and described in U.S. Pat. No. 6,626,575.

Referring to FIG. 5, the second groove 30 defines a mounting channel section 56 which is adapted to directly engage the seal base 32C. The internal seal 32 defines an external groove engaging surface 54 which is adapted to engage the mounting channel section 56. It is preferable that the groove engaging surface 54 and the mounting channel section 56 be of a complementary mated configuration to maintain full contact for holding of the seal base 32C firmly within the seal mounting groove 30 under all operating conditions.

One of the inventive characteristics of the present invention is the ability to have effective full sealing and wiping of a bearing surface even after an extensive time period of use. This is achievable due to the enhanced wear characteristics of this design. This configuration allows a significant amount of wear to occur on the outer lip 32B and inner lip 32A of the internal seal 32 of the present invention without significantly effecting sealing, scrapping and wiping. This is achieved due to the resilience of the material from which the internal seal 32 is formed. As shown in FIG. 5 after insertion is made along arrow K the inner and outer lips 32A and 32B will still be flexibly compressed to a slight extent. This slight compression enhances sealing between the convex contoured surface 20 and the inner surface 16, while allowing wear to occur while still maintaining the seal. Thus, the construction of the inverted V-shaped downwardly facing seal provides a self-adjusting characteristic that the inventor has found to be especially suitable for use as an internal seal positioned axially inward from a more flexible external seal, not present in constructions heretofore.

Figure 4:
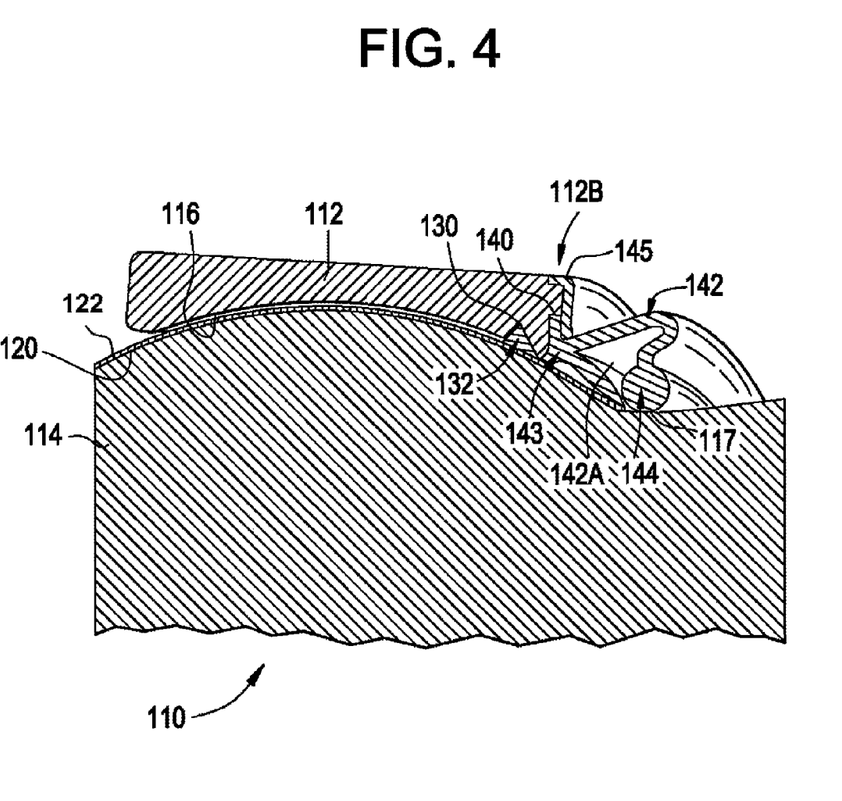
FIG. 4 is a cross sectional view of a portion of a bearing assembly having an internal seal and an external seal in accordance with another embodiment of the present invention.

In one embodiment as shown in FIG. 4, the bearing assembly 110 includes an internal seal 132 positioned a first annular groove 130 proximate a second end 112B of an outer race 112, and extending across an interface of the outer race 112 and a ball 114. The bearing assembly 110 further includes an external seal or boot seal 142 positioned in a second annular groove 140 proximate the second end 112B of the outer race 112, and extending across the interface of the outer race 112 and the ball 114 to inhibit the ingress of debris and contaminants into the bearing assembly 110. The boot seal 142 forms a ring and has an inner edge 143 and an outer edge 144. The boot seal 142 has a generally hollow generally triangular cross section defining an interior area 142A therein. It should be understood that the geometry of the boot seal 142 may vary depending on the geometry of the outer race 112, the ball 114, and the bearing assembly 110 generally. The inner edge 143 of the boot seal 142 is secured to the outer race 112 by, for example, a retainer 145 and/or a bonding agent. In some embodiments, the inner edge 143 of the boot seal 142 pressingly engages the outer race 112 thereby attaching the inner edge 143 to the outer race 112 with a corresponding press-fit. It should be understood that any known method for securing the inner edge 143 to the outer race 112 may be used. In the embodiment shown in FIG. 4, the boot seal 142 is an elastomer. The boot seal 142 may be made from, for example, natural rubber, silicones, or other synthetic elastomer materials such as, for example, nitrile, urethane, polyurethane, and the like.

Referring to FIG. 4, the ball 114 defines an annular groove 117 that extends along an outer circumference of the ball 114. In the illustrated embodiment, the outer edge 144 of the boot seal 142 is pressingly seated in the annular groove 117 such that the outer edge 144 and the annular groove 117 form an interference fit. The bulbous protrusion of the outer edge 144, in part, helps to form the interference fit with the annular groove 117. While the outer edge 144 of the boot seal 142 is disclosed as having a bulbous protrusion, the present invention is not limited in this regard as the outer edge 144 may have any geometry for interfacing with the annular groove 117.

Referring back to FIG. 3 and FIG. 5, in one embodiment, the bearing assembly 10, 110 includes a self-lubricating coating composition applied to the contoured surface of the ball 14, 114 to form a lubricious liner 22, 122. The present invention is not limited in this regard, however, as the lubricious liner 22, 122 is optional. In embodiments employing the lubricious liner 22, 122, the coating composition forming the lubricious liner 22, 122 may be applied to one or more of the spherically convex contoured surface 20, 120 of the ball 14, 114 and the inner surface 16, 116 of the outer race 12, 112. In embodiments of the bearing assembly 10 in which the lubricious liner 22, 122 is present, one or more of the spherically convex contoured surface 20, 120 of the ball 14 and the inner surface 16, 116 of the outer race 12, 112 are generally treated to achieve a desired surface finish (e.g., via a grit-blasting operation). The surfaces are then cleaned and dried, and the coating composition is applied by a method such as, for example, spraying, spinning, dipping, injection, bonding, or the like. Once the self-lubricating coating composition is applied, the composition may be cured by any suitable method and subsequently machined to particularly desired measurements to form the lubricious liner 22, 122. The lubricious liner 22, 122, when employed, is a fabric liner system that includes polytetrafluoroethylene (PTFE) fiber that may be woven with other fabrics, such as, but not limited to, cotton, polyester, glass fiber, carbon fiber, nylon, or aramid materials such as NOMEX® and KEVLAR® manufactured by DuPont. The fabric may then be set in a thermosetting resin or thermoplastic resin. The PTFE fibers may include chopped PTFE fibers in addition to the other fibers and resins.

The ball 14 may be made from a steel or other metallic based alloy including, but not limited to, aluminum, titanium, nickel, copper, cobalt, and the like. For example, the ball 14 may be made from AISI 52100, AISI 440C, 4340 or 4130 alloy steel, 17-4PH, 15-5PH, or 13PH-8MO. It is also contemplated that the ball 14 may be made from other materials that are sufficiently hard or can be sufficiently hardened through heat treatment or surface treatment. The ball 14 may also be chrome plated.

The outer race 12 may be made from a steel or an alloy steel, including, but not limited to, 4340, 4130, 17-4PH, 15-5PH, or 13PH-8MO, or another suitable material. It is also contemplated that the outer race 12 may be made of a material that provides for a sufficient mating surface for either a self-lubricating coating composition on the contoured surface of the ball 14, or for a greased metal-on-metal bearing. The outer race 12 and the ball 14 may be made of the same or different materials.

Referring to FIGS. 6A, 6B and 7-9, the bearing assemblies 10 and 110 may be utilized in a variety of situations and applications, including, but not limited to, vehicle suspension systems (e.g., FIGS. 6A, 6B and 7, see strut 222 and with the bearing assemblies 10, 110 positioned in pivot connections 224 and 226) and steering systems for heavy haul trucks 220. In one embodiment, the bearing assemblies 10 and 110 may be utilized in a suspension system and/or a steering system of mining and construction vehicles 220 for pivotally or rotationally connecting structural components to the vehicle such as, for example, struts or other telescopic dampers, hydraulic cylinders (e.g., FIG. 8 see upper hoist cylinder with a bearing 10, 110 located in at pivot connection 230) or other mechanical and pneumatic actuators, a panhard link (e.g., FIG. 9, see panhard link 241 with bearings 10, 110 located in pivot connections 240) or other link of a multi-link suspension system, and the like. The use of the bearing assemblies 10 and 110 is not limited in this regard as it is contemplated to use such bearing assemblies in other applications, such as, for example, military vehicles including a tank or transport vehicle, and other heavy duty equipment, such as, for example, heavy duty pick-up trucks, dump trucks, fire trucks, and the like.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the foregoing description.

What is claimed is:
1. A bearing assembly, comprising:
an inner member having an outer engagement surface;
an outer race having:

an inner surface defining a first end and a second end and an inner engagement surface therebetween, the inner engagement surface being positioned on the outer engagement surface of the inner member and contoured to a shape complementary to the outer engagement surface of the inner member such that the outer engagement surface of the inner member is slidably and rotatably engaged with the inner engagement surface of the outer race;

a first annular groove formed in the inner surface, proximate one of the first end and the second end;

a second annular groove formed in the inner surface and being positioned axially inward from the first annular groove, the second annular groove defining a mounting channel section;

an external seal positioned in the first annular groove and slidably engaging the inner member; and an internal seal positioned in the second annular groove and slidingly engaging the inner member, the internal seal defining an inner lip, an outer lip and a base therebetween, the base directly engaging the mounting channel section;

wherein the internal seal is stiffer than the external seal; and wherein the inner lip and the outer lip are flexibly compressed.

2. The bearing assembly of claim 1 wherein the internal seal comprises a thermoplastic double lip internal scraper seal.

3. The bearing assembly of claim 1 wherein:
the internal seal comprises a first ring;
the external seal comprises a second ring; and
the first ring is harder than the second ring.

4. The bearing assembly of claim 1 wherein the first annular groove and the second annular groove are concentric with one another.

5. The bearing assembly of claim 4 wherein the external seal is a boot seal, the boot seal defining an inner edge and an outer edge, the inner edge engages the outer race and the outer edge engages a third annular groove defined in the inner member.

6. The bearing assembly of claim 1 wherein the external seal comprises a single lip, metal-backed elastomeric external seal.

7. The bearing assembly of claim 1 further comprising a lubricious liner disposed on one or more of the outer engagement surface of the inner member and the inner engagement surface of the outer race.

8. The bearing assembly of claim 1 wherein the first annular groove defines a cross section having a substantially U-shaped geometry and the second annular groove defines a cross section having substantially V-shaped geometry.

9. The bearing assembly of claim 1 wherein the internal seal defines a cross section having a substantially V-shaped geometry defined by the inner lip, the outer lip and an apex therebetween, and each of the inner lip and outer lip respectively define a first end proximate to the apex and a respective second end that slidingly engages the inner member.

10. The bearing assembly of claim 1 further comprising a first void volume formed between the internal seal and the external seal, a second void volume formed between the internal seal and the engagement surface of the outer race and the inner member, and a third void volume formed between the inner lip and the outer lip wherein the first, second and third void volumes are filled with a sealant material.

11. A sealing arrangement for a bearing assembly having an inner member with an outer engagement surface, an outer race having an inner surface and an inner engagement surface slidably and rotatably engaged with the inner member outer engagement surface, the sealing arrangement comprising:

an external seal configured to be positioned in a first annular groove defined in the outer race inner surface and slidably engaging the inner member; and an internal seal configured to be positioned in a second annular groove defined in the outer race inner surface and slidably engaging the inner member, the internal seal defining an inner lip, an outer lip and a base therebetween, the base directly engaging a mounting channel section defined in the second annular groove;

wherein the internal seal is stiffer than the external seal; and wherein the inner lip and the outer lip are flexibly compressed.

12. The sealing arrangement of claim 11 wherein the external seal, and the external seal comprises one of a flexible ring or a boot seal.

13. The sealing arrangement of claim 11 wherein the internal seal comprises a thermoplastic double lip internal scraper seal and the external seal comprises single lip, metal-backed elastomeric external seal.

14. The sealing arrangement of claim 11 further comprising a lubricious liner disposed on one or more of the outer engagement surface of the inner member and the inner engagement surface of the outer race.

15. The sealing arrangement of claim 11 further comprising a first void volume formed between the internal seal and the external seal, a second void volume formed between the internal seal and the engagement surfaces of the outer race and the inner member, and a third void volume formed between the inner lip and the outer lip wherein the first, second and third void volumes are filled with a sealant material.

16. A method of sealing a bearing assembly, comprising the steps of:

providing a spherical plain bearing having an outer race and an inner member disposed in the outer race, the inner member and the outer race being rotatable relative to each other, the outer race having an inner surface and having a first annular groove formed therein proximate to each of two opposing ends of the outer race and the inner surface having a second annular groove positioned axially inward from each of the respective first annular grooves;

providing an internal seal and positioning the internal seal in at least one of the second annular grooves, the internal seal defining an inner lip, an outer lip and a base therebetween, the base directly engaging a mounting channel section defined in the second annular groove; and providing an external seal and positioning the external seal in at least one of the first annular grooves;

wherein the internal seal is stiffer than the external seal; and wherein the inner lip and the outer lip are flexibly compressed.

17. The method of claim 16 wherein providing the external seal comprises providing one of a single lip, metal-backed elastomeric external seal or a boot seal.

18. The method of claim 16 wherein providing the internal seal comprises providing a thermoplastic double lip internal scraper seal, and wherein providing the external seal comprises providing a single lip, metal-backed elastomeric external seal.

19. The method of claim 16 further comprising providing a lubricious liner disposed on one or more of an outer surface of the inner member and an inner surface of the outer race.

20. The method of claim 16 further comprising filling a first void volume formed between the internal seal and the external seal with a sealant material, filling a second void volume formed between the internal seal and an engagement surface of the outer race and the inner member with the sealant material; and filling a third void volume formed between the inner lip and the outer lip with a sealant material.

* * * * *